(12) United States Patent
Pudleiner et al.

(10) Patent No.: US 9,334,385 B2
(45) Date of Patent: May 10, 2016

(54) THERMOPLASTIC COMPRISING METAL IDENTIFICATION PLATELETS

(75) Inventors: Heinz Pudleiner, Krefeld (DE); Mehmet-Cengiz Yesildag, Leverkusen (DE); Dirk Pophusen, Bergisch-Gladbach (DE); Klaus Meyer, Dormagen (DE)

(73) Assignee: Bayer MaterialScience AG, Leverkusen (DE)

( * ) Notice: Subject to any disclaimer, the term of this patent is extended or adjusted under 35 U.S.C. 154(b) by 944 days.

(21) Appl. No.: 12/677,700

(22) PCT Filed: Sep. 2, 2008

(86) PCT No.: PCT/EP2008/007140
§ 371 (c)(1),
(2), (4) Date: Mar. 11, 2010

(87) PCT Pub. No.: WO2009/036878
PCT Pub. Date: Mar. 26, 2009

(65) Prior Publication Data
US 2010/0196699 A1 Aug. 5, 2010

(30) Foreign Application Priority Data
Sep. 12, 2007 (DE) .......................... 10 2007 044 146

(51) Int. Cl.
*B32B 5/16* (2006.01)
*B29C 47/00* (2006.01)
(Continued)

(52) U.S. Cl.
CPC ... *C08K 3/08* (2013.01); *C08K 7/00* (2013.01); *C08L 69/00* (2013.01); *G03H 2230/10* (2013.01); *G03H 2270/24* (2013.01); *Y10T 428/256* (2015.01)

(58) Field of Classification Search
USPC .......................................................... 428/328
See application file for complete search history.

(56) References Cited

U.S. PATENT DOCUMENTS 3,365,517 A    1/1968    Barth
3,423,479 A    1/1969    Hendricks
(Continued)

FOREIGN PATENT DOCUMENTS

CA           2698610        9/2008
CN    200880108884.1    9/2008
(Continued)

OTHER PUBLICATIONS

U.S. Appl. No. 12/877,700, filed Sep. 8, 2010.

*Primary Examiner* — Ronak Patel
(74) *Attorney, Agent, or Firm* — Drinker Biddle & Reath LLP

(57) ABSTRACT

The invention relates to a transparent thermoplastic material, containing 0.0001 to 2 wt. % of substantially flat metal identification platelets with a largest length elongation of less than 200 μm and a thickness of 2-10 μm, a round or n-angled shape where n≥4, wherein the metal identification platelets do not have any recesses or have recesses that lie substantially in the center of the metal identification platelet, do not come closer than 20 μm to the circumferential outer edge of the metal identification platelet, and do not account for more than 30% of the surface area of the metal identification platelet. The invention also relates to the production thereof and the use for producing films for personalization of a card layer composite and data carriers in card form, especially smart cards, magnetic strip cards, identification cards and the like.

11 Claims, 5 Drawing Sheets

(51) Int. Cl.
  *C08K 3/08*   (2006.01)
  *C08K 7/00*   (2006.01)
  *C08L 69/00*  (2006.01)

(56) References Cited

U.S. PATENT DOCUMENTS

| | | | |
|---|---|---|---|
| 3,960,815 | A | 6/1976 | Darsow et al. |
| 4,152,367 | A | 5/1979 | Binsack et al. |
| 4,368,231 | A | 1/1983 | Egert et al. |
| 4,368,240 | A | 1/1983 | Nauta et al. |
| 5,912,070 | A | 6/1999 | Miharu et al. |
| 6,068,936 | A | 5/2000 | Peiffer et al. |
| 2010/0110514 | A1 * | 5/2010 | Houha et al. ............... 359/2 |

FOREIGN PATENT DOCUMENTS

| | | |
|---|---|---|
| DE | 1719244 A1 | 8/1971 |
| DE | 2305413 A1 | 8/1974 |
| DE | 2517032 A1 | 10/1976 |
| DE | 2517033 A1 | 11/1976 |
| DE | 2531240 A1 | 1/1977 |
| DE | 2735092 A1 | 2/1979 |
| DE | 2735144 A1 | 2/1979 |
| DE | 3010143 B1 | 7/1981 |
| DE | 102007044146.2 | 9/2007 |
| EP | 765909 A1 | 4/1997 |
| EP | 1216758 A1 | 6/2002 |
| EP | 08785787.6 | 9/2008 |
| GB | 1515439 A | 6/1978 |
| GB | 2346583 A | 8/2000 |
| ID | 201000789 | 9/2008 |
| IN | 1333-2010 | 9/2008 |
| JP | 024378-2010 | 8/2008 |
| KR | 10-2010-70053 63 | 9/2008 |
| MY | 2010001046 | 9/2008 |
| SG | 201000920.7 | 9/2008 |
| TH | 0801004516 | 9/2008 |
| TW | 97134784 | 9/2008 |
| WO | WO-98/56850 A1 | 12/1998 |
| WO | WO-2005/078530 A1 | 8/2005 |
| WO | WO 2008/061930 * | 5/2008 |
| WO | PCT/EP2008/007140 | 9/2008 |

* cited by examiner

Magnification: 50x
Transmitted light, bright field

US 9,334,385 B2

THERMOPLASTIC COMPRISING METAL IDENTIFICATION PLATELETS

CROSS-REFERENCE TO RELATED APPLICATIONS

This application is a national stage application (under 35 U.S.C. §371) of PCT/EP2008/007140, filed Sep. 2, 2008, which claims benefit of German application 10 2007 044 146.2, filed Sep. 12, 2007.

BACKGROUND OF THE INVENTION

The present invention relates to a transparent thermoplastic material containing 0.0001 to 2 wt. % of substantially planar metal identification platelets with a greatest longitudinal dimension of less than 200 µm and a thickness of 2-10 µm, a round or n-agonal shape where n≥4, characterised in that the metal identification platelets have no recesses or have recesses that lie substantially in the centre of the metal identification platelet, do not come closer than 20 µm to the circumferential outer edge of the metal identification platelet, and do not form more than 30% of the surface of the metal identification platelet, and also relates to its production and use for the preparation of films for personalising a card layer composite and card-shaped data carriers, in particular smart cards, magnetic strip cards, identity cards and the like.

Data carriers and in particular documents containing valuable information are as a rule provided with security features for protection purposes, which enable the validity of the data carrier to be checked and at the same time serve as protection against unauthorised copying of the data carrier. In many cases optically variable elements are used as security features, which enable the observer to check the validity of the document containing valuable information by various methods, for example by means of IR or UV spectroscopy as well as light microscopy.

Metal identification platelets can serve as a security feature and are in principle known and described for example in WO 2005/078530.

The use of such identification platelets is described for example in European Patent EP-A-1216758.

A microdot for the identification of products is known from UK Patent GB 2346583.

BRIEF SUMMARY OF THE INVENTION

The object on which the invention is based is to introduce a metal identification platelet as security feature into at least one layer of thermoplastic laminated materials, so as to provide an effective protection for a data carrier. In particular it should be difficult to alter or copy the protected data carriers and it should also be possible for an expert to check their validity or integrity. Furthermore it is essential that the characteristic features of the metal identification platelets such as shape, printing, hologram and perforation shape are not altered during the various thermoplastic processing and forming steps.

This object is achieved by a transparent thermoplastic material containing 0.0001 to 2 wt. % of substantially planar metal identification platelets with a greatest longitudinal dimension of less than 200 µm and a thickness of 2-10 µm, a round or n-agonal shape where n≥4, characterised in that the metal identification platelets have no recesses or have recesses that lie substantially in the centre of the metal identification platelet, do not come closer than 20 µm to the circumferential outer edge of the metal identification platelet, and do not form more than 30% of the surface of the metal identification platelet.

A BRIEF DESCRIPTION OF THE FIGURES

DETAILED DESCRIPTION OF THE INVENTION

Figure 1:
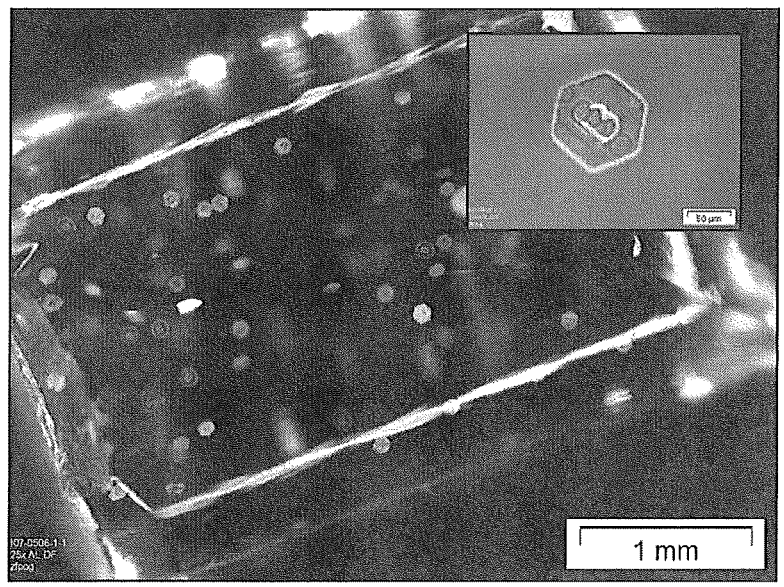
FIG. 1 illustrates a light microscopy image of a cylindrical grain of granular material and showed that the metal identification platelets were small, luminously reflecting hexagons.

The metal identification platelets preferably used in the present invention can be printed and/or characterised by a hologram as identification code on the platelet, by an arbitrarily shaped through perforation that is visible from both sides of the identification platelet. In addition the identification platelet is defined by the external shape of the platelet. In the preferred embodiment the identification platelets have an n-agonal shape, where n≥4, and particularly preferably have a hexagonal shape.

The diameter of the identification platelets from side to side can range for example from 5 to 200 µm, preferably 10 to 150 µm, and particularly preferably 10 to 120 µm.

A hologram or some other feature can be printed on the surface of the identification platelets. The identification platelets can contain a shaped perforation comprising one or more alphanumeric letters.

The identification platelet consists of metal, preferably of nickel, and can be for example 1 to 15 µm thick, preferably 1 to 10, and particularly preferably 3 to 8 µm thick.

The identification platelets are preferably incorporated in thermoplastic materials, in particular transparent thermoplastic materials. Laminates such as films or sheets as well as multilayer composites of such laminated materials can then be produced from the thermoplastic material.

Suitable thermoplastic materials are polycarbonates or co-polycarbonates based on diphenols, polyacrylates or co-polyacrylates and polymethacrylates or co-polymethacrylates, such as for example and preferably polymethyl methacrylate (PMMA), polymers or copolymers with styrene, such as for example and preferably transparent polystyrene (PS) or polystyrene-acrylonitrile (SAN), transparent thermoplastic polyurethanes, as well as polyolefins, such as for example and preferably transparent types of polypropylene, or polyolefins based on cyclic olefins (e.g. TOPAS®, Topas Advanced polymers), polycondensates or co-polycondensates of terephthalic acid, such as for example and preferably polyethylene terephthalate or co-polyethylene terephthalate (PET or CoPET) or glycol-modified PET (PETG), polyethylene glycol naphthenate (PEN), and transparent polysulfones (PSU).

Thermoplastic polymethyl methacrylates that are suitable for the layer are for example the commercially available Plexiglas® types.

According to the invention suitable sheets of thermoplastic materials are, for example, those formed from known thermoplastic aromatic polycarbonates with weight average molecular weights Mw of 25 000 to 200 000, preferably 30 000 to 120 000 and in particular 30 000 to 80 000 (Mw determined from Eta rel. in dichloromethane at 20° C. and at a concentration of 0.5 g per 100 ml) and those formed from known thermoplastic polyaryl sulfones, which can be linear (see DE-OS 27 35 144) or branched (see DE-OS 27 35 092 or DE-OS 23 05 413).

Suitable linear polyaryl sulfones are all known aromatic polysulfones or polyether sulfones with Mw (weight average molecular weight measured for example by light scattering) of between about 15 000 and about 55 000, preferably between about 20 000 and about 40 000. Such polyaryl sulfones are described for example in DE-OS 17 19 244 and US-PS 33 65 517.

Suitable branched polyaryl sulfones are in particular the branched polyaryl ether sulfones according to DE-OS 23 05 413 or US-PS 39 60 815, whose Mw (weight average molecular weight, measured for example by means of light scattering) are between about 15 000 and about 50 000, preferably between about 20 000 and 40 000 (for further details see DE-AS 30 10 143).

Also suitable are films of thermoplastic cellulose esters, thermoplastic polyvinyl chlorides, thermoplastic styrene-acrylonitrile copolymers and thermoplastic polyurethanes.

Suitable cellulose esters are obtained by conventional methods, by esterification of cellulose with aliphatic monocarboxylic acid anhydrides, preferably acetic anhydride and butyric anhydride or acetic anhydride and propionic anhydride.

The viscosity of the cellulose esters should be 0.3 to 0.5 Poise, measured as a 20 wt. % solution in acetone. Cellulose esters that are preferably used have in the case of acetobutyrates an acetic acid content of 17 to 23 wt. % and a butyric acid content of 45 to 50 wt. %, and in the case of acetopropionates a propionic acid content of 61 to 69 wt. % and an acetic acid content of 2 to 7 wt. %. The OH numbers are normally between 4 and 25. The weight average molecular weights Mw are between 10 000 and 1 000 000, preferably between 100 000 and 500 000.

Suitable thermoplastic polyvinyl chlorides are for example the commercially available PVC types.

Suitable thermoplastic styrene-acrylonitrile copolymers are copolymers of styrene with preferably acrylonitrile that have been obtained for example by suspension polymerisation in the presence of catalysts from the monomers or mixture of monomers with Mw from 1 to 60 (Mw is measured in DMF at C=5 g/l and 20° C.). For the relevant literature see Beilsteins Handbuch der organischen Chemie, 4$^{th}$ Edition, Duttes Ergänzungswerk Vol. 1.5, pp. 1163-1169, Springer Verlag 1964, H. Ohlinger, Polystyrene, 1st Part, Production Methods and Properties of the Products, Springer Verlag (1955).

The thermoplastic resins, e.g. styrene-acrylonitrile or alpha-methylstyrene-acrylonitrile copolymers can be produced by known methods, for example by bulk polymerisation, solution polymerisation, suspension polymerisation and emulsion polymerisation.

Cycloolefin copolymers are described in the patent specifications of the companies Mitsui Chemicals U.S. Pat. No. 5,912,070 and Ticona GmbH EP 765 909.

Thermoplastic polyurethanes can be used for the production of the layers according to the invention.

For the production of the laminated materials, in particular films, reference may be made to DE-OS 2 033 and DE-OS 2 240.

The films can be matt on one side or structured on one side. This is achieved by forcing the melt of the thermoplastic material through a slot die and drawing the melt strand over a matt or structured cooling roller.

The laminated materials can also be polished on one side and matt on one side.

The thickness of the laminated materials is preferably 0.05 to 0.8 mm.

Composite films with polyurethane bonding are known (DE-OS 25 17 032 and DE-AS 30 10 143).

The thermoplastic layer can either be a single-ply layer of these plastics materials or can be a multi-ply plastics layer formed from individual plies of different plastics in each case 0.050 to 0.8 mm thick.

EXAMPLES

Examples 1 and 2

Preparation of Compounds

Example 1

According to the Invention

Starting Material

Hexagonal metal identification platelets with the designation "OV Dot B" made of nickel, with a thickness of 5 µm and a distance between oppositely facing sides of 100 µm, were used. The platelets were printed, the lettering "OVDot" being legible in the relevant sections. A large "B" in the form of a through perforation was located in the centre of the platelets. The distance from the perforation to the sides was 25 µm and the perforation accounted for 12.5% of the total surface area of the metal identification platelet.

The diameter of the metal identification platelet, distance from the through perforation to the sides, and size of the perforation as a fraction of the total surface area of the metal identification platelet are according to the invention.

A compound was produced with the metal identification platelets.

150 g of the metal identification platelets described above were mixed in an intensive mixer with 2.35 kg of Makrolon 3108 550115 powder (mean particle diameter 800 µm). Makrolon® 3108 550115 is of EU/FDA quality and contains no UV absorber. The melt volume flow rate (MVR) according to ISO 1133 is 6.0 cm$^3$/(10 min) at 300° C. and 1.2 kg load.

At a throughput of the extruder of 50 kg/hour 47.5 kg of Makrolon 3108 550115 cylindrical granules were extruded into compartment 1 of a ZSK twin-screw extruder. The metal identification platelet/Makrolon powder mixture was metered in through a side extruder. A transparent, particle-containing melt was obtained downstream of the 6-hole die plate, and after cooling in a water bath and strand pelletisation yielded 50 kg of cylindrical granules containing 0.3 wt. % of metal identification platelets.

A light microscopy image of a cylindrical grain of granular material (FIG. 1) showed that the metal identification platelets were small, luminously reflecting hexagons. No bent, damaged or even destroyed platelets could be recognised. Despite the shear forces and the temperature stress the through perforation in the form of a "B" remained undamaged. Also, the printing on the platelet was easily legible and was not affected by the processing temperature of 300° C. in the polycarbonate melt.

Example 2

According to the Invention

Starting Material

Hexagonal metal identification platelets with the designation "OV Dot O" made of nickel, with a thickness of 5 μm and a distance between oppositely facing sides of 100 μm, were used. The platelets were printed, the lettering "OV Dot" being legible in the relevant sections. A large "O" as through perforation was located in the centre of the platelets. The distance from the through perforation to the side was 25 μm and the perforation accounted for 11.5% of the total surface area of the metal identification platelet.

The diameter of the metal identification platelet, distance from the through perforation to the sides, and size of the perforation as a fraction of the total surface area of the metal identification platelet are according to the invention.

A compound was produced with the metal identification platelets.

150 g of the metal identification platelets described above were mixed in an intensive mixer with 2.35 kg of Makrolon 3108 550115 powder (mean particle diameter 800 μm). At a throughput of the extruder of 50 kg/hour 47.5 kg of Makrolon 3108 550115 cylindrical granules were extruded into compartment 1 of a ZSK twin-screw extruder. The metal identification platelet/Makrolon powder mixture was metered in through a side extruder. A transparent, particle-containing melt was obtained downstream of the 6-bore die plate, and after cooling in a water bath and strand pelletisation yielded 50 kg of cylindrical granules containing 0.3 wt. % of "OV Dot O" metal identification platelets.

Figure 2:
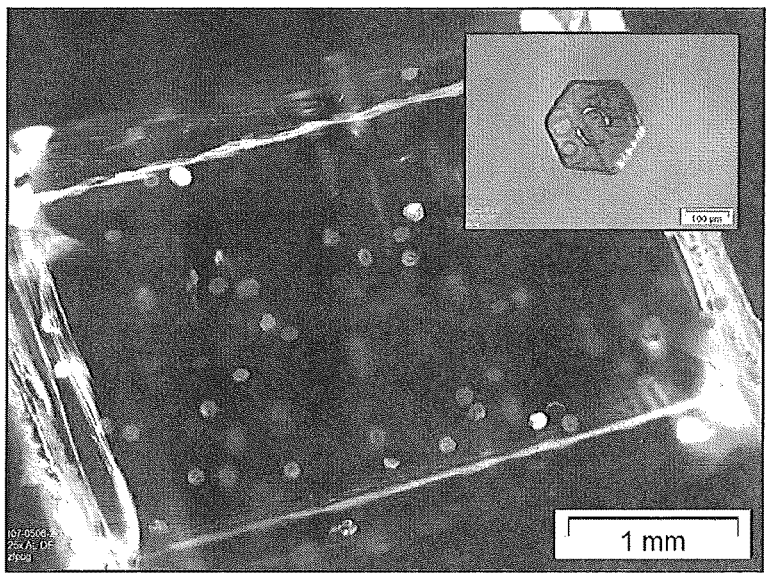
FIG. 2 illustrates a light microscopy image of a grain of granular material and showed that the metal identification platelets were small, luminously reflecting hexagons.

A light microscopy image of a grain of granular material (FIG. 2) showed that the metal identification platelets were small, luminously reflecting hexagons. No bent, damaged or even destroyed platelets could be recognised. Despite the shear forces and the temperature stress the through perforation in the form of an "O" remained undamaged. Also, the printing on the platelet was easily legible and was not affected by the processing temperature of 300° C. in the polycarbonate melt.

Examples 3 and 4

Extrusion into Films

Example 3

According to the Invention

A film was extruded from the compound of Example 1.
The equipment used for the production of the films consists of
a main extruder with a screw of 105 mm diameter (D) and a length of 41×D; the screw includes a degassing zone;
an adapter;
a slot die of 1500 mm width;
a three-roller smoothing calender with a horizontal roller arrangement, wherein the third roller can be swivelled by ±45° with respect to the horizontal;
a roller conveyer
a device for the bilateral application of protective film;
a draw-off device;
winding station.

The compound of Example 1 was added to the feed hopper of the extruder. The melting and conveyance of the respective material took place in the respective plasticization system cylinder/screw of the extruder. The material melt was then fed through the adapter to the smoothing calender, the rollers of which were at the temperature given in Table 1. The final shaping and cooling of the film took place on the smoothing calender (consisting of three rollers). A rubber roller (fine-matt second surface) and a steel roller (matt sixth surface) were used for the structuring of the film surfaces. The rubber roller used for the structuring of the film surface is disclosed in U.S. Pat. No. 4,368,240 in the name of Nauta Roll Corporation, USA. The film was then transported away by a take-off device. Following this a protective film of polyethylene can be applied to both sides and the film can be wound.

TABLE 1

| Process parameters | |
|---|---|
| Temperatures of the compartments of the extruder Z1 to Z9 | 200 to 285° C. |
| Temperature of the dies Z1 to Z14 | 300° C. |
| Temperature of the adapter | 290° C. |
| Temperature of the melt | 285° C. |
| Rotational speed of the extruder | 50 min$^{-1}$ |
| Temperature of the rubber roller 1 | 15° C. |
| Temperature of the roller 2 | 110° C. |
| Temperature of the roller 3 | 140° C. |
| Take-off speed | 26.3 m/min |
| Throughput | 275.6 kg/hour |

In order to be able to investigate the finished film also as regards its properties for laser printing, a laser additive was additionally incorporated into the film.

The following composition containing metal identification platelets and carbon black was fed to the extruder:

68.6 wt. % of Makrolon® 3108 550115 (PC from Bayer MaterialScience AG)

20.0 wt. % of master batch from Example 1 (with 0.3 wt. % of OV Dot "B" metal identification platelets)

11.4 wt. % of Makrolon® 3108 751006 (carbon black-containing PC from Bayer MaterialScience AG)

A transparent grey (laser-printable) extrusion film with a matt/fine-matt (6-2) surface, a metal identification platelet content of 0.06 wt. % and a thickness of 100 μm was obtained therefrom.

Figure 3:
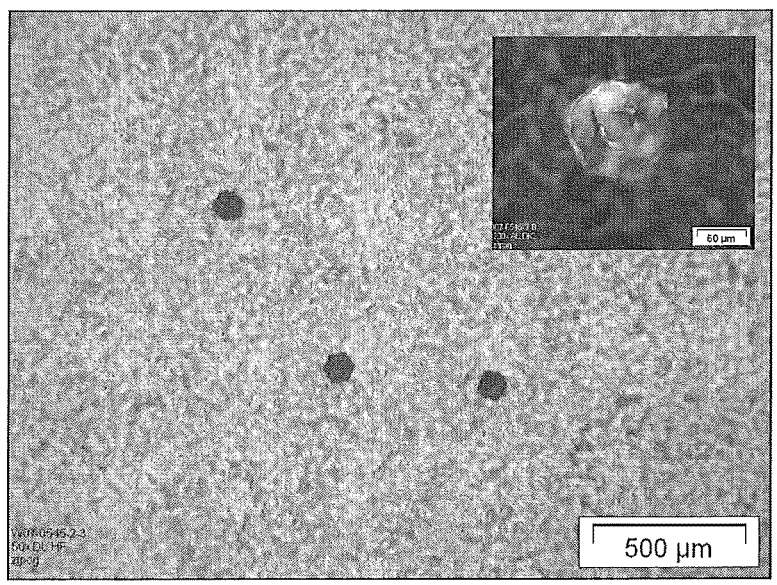
FIG. 3 illustrates the metal identification platelets could clearly be recognized as small luminously dark hexagons in the light microscopy image of the film.

The metal identification platelets could clearly be recognised as small luminously dark hexagons in the light microscopy image of the film (FIG. 3). The metal identification platelets were distributed uniformly over the whole film surface. No aggregated/agglomerated platelets could be identified. Also, no damaged or even destroyed platelets were recognisable. Despite the shear forces and the temperature stress in the film extrusion, the through perforation "B" remained undamaged.

Example 4

According to the Invention

A film was extruded from the compound of Example 2.

The equipment used for the production of the films consists of
- a main extruder with a screw of 105 mm diameter (D) and a length of 41×D; the screw includes a degassing zone;
- an adapter;
- a slot die of 1500 mm width;
- a three-roller smoothing calender with a horizontal roller arrangement, wherein the third roller can be swivelled by ±45° with respect to the horizontal;
- a roller conveyer
- a device for the bilateral application of protective film;
- a draw-off device;
- winding station.

The compound of Example 2 was added to the feed hopper of the extruder. The melting and conveyance of the respective material took place in the respective plasticization system cylinder/screw of the extruder. The material melt was then fed through the adapter to the smoothing calender, the rollers of which were at the temperature given in Table 2. The final shaping and cooling of the film took place on the smoothing calender (consisting of three rollers). A rubber roller (fine-matt second surface) and a steel roller (matt sixth surface) were used for the structuring of the film surfaces. The rubber roller used for the structuring of the film surface is disclosed in U.S. Pat. No. 4,368,240 in the name of Nauta Roll Corporation, USA. The film was then transported away by a take-off device. Following this a protective film of polyethylene can be applied to both sides and the film can be wound.

TABLE 2

| Process parameters | |
|---|---|
| Temperatures of the compartments of the extruder Z1 to Z9 | 200 to 285° C. |
| Temperature of the dies Z1 to Z14 | 300° C. |
| Temperature of the adapter | 290° C. |
| Temperature of the melt | 284° C. |
| Rotational speed of the extruder | 50 min$^{-1}$ |
| Temperature of the rubber roller 1 | 15° C. |
| Temperature of the roller 2 | 110° C. |
| Temperature of the roller 3 | 140° C. |
| Take-off speed | 26.5 m/min |
| Throughput | 275.2 kg/hour |

In order to be able to investigate the finished also as regards its properties for laser printing, a laser additive was additionally incorporated into the film.

The following composition containing metal identification platelets and carbon black was fed to the extruder:
- 68.6 wt. % of Makrolon® 3108 550115 (PC from Bayer MaterialScience AG)
- 20.0 wt. % of master batch from Example 2 (with 0.3 wt. % of OV Dot "O" metal identification platelets)
- 11.4 wt. % of Makrolon® 3108 751006 (carbon black-containing PC from Bayer MaterialScience AG)

A transparent grey (laser-printable) extrusion film with a matt/fine-matt (6-2) surface, a metal identification platelet content of 0.06 wt. % and a thickness of 100 µm was obtained therefrom.

The metal identification platelets could clearly be recognised as small luminously dark hexagons in the light microscopy image of the film. The metal identification platelets were distributed uniformly over the whole film surface. No aggregated/agglomerated platelets could be identified. Also, no damaged or even destroyed platelets were recognisable. Despite the shear forces and the temperature stress in the film extrusion, the through perforation "O" remained undamaged.

Example 5

According to the Invention

A card was laminated from the following films:

| | |
|---|---|
| Core film | 375 µm Makrofol ID 6-4 colour 010207 (white) |
| A ply in each case above and below | |
| Film according to the invention: | 100 µm film from Example 3, 6-2 |
| Overlay film | 100 µm Makrofol ID 6-2, colour 000000 (natural) |

The films were laminated in a Bürkle press at 10 bar and 180° C. The metal identification platelets were then examined by light microscopy as regards their appearance.

Figure 4:
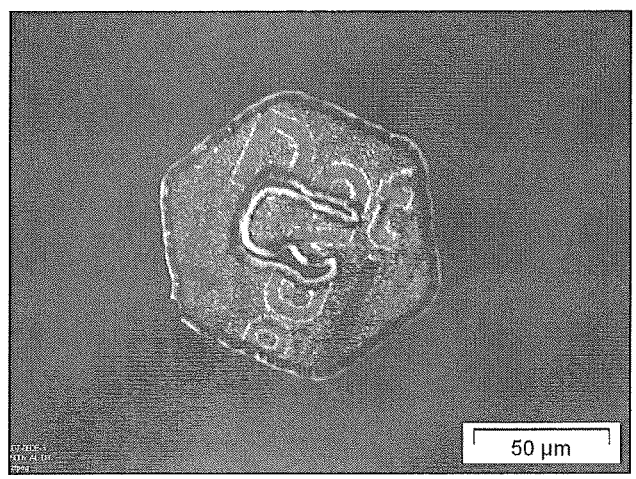
FIG. 4 illustrates a light microscopy image of a metal identification platelet and showed that they had not been damaged or destroyed by the laminating process.

In a light microscopy image of a metal identification platelet (FIG. 4) it could be seen that they had not been damaged or destroyed by the laminating process. Despite the pressure and the temperature stress in the lamination, the through perforation "B" remained undamaged. The printing on the platelet was clearly legible. The original surface structuring of the film had been pressed smooth during the laminating process.

Example 6

Not According to the Invention

Starting Mixture

A mixture of tetragonal and hexagonal metal identification platelets of various sizes with the designation "OV Dot Mix" made from nickel, with a thickness of 5 µm and a distance between oppositely facing sides of 50 to 500 µm, was used. The platelets were printed, the lettering "OVDot" being legible in the relevant sections. Various letter combinations in the form of through perforations were located in the centre of the platelets.

Figure 5:
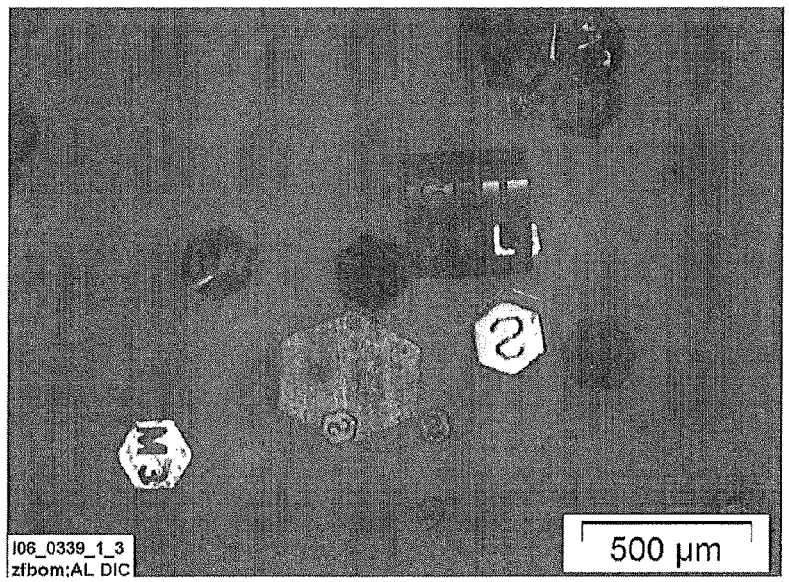
FIG. 5 shows a light microscopy image of the mixture of tetragonal and hexagonal metal identification platelets of various sizes.

FIG. 5 shows a light microscopy image of the mixture of tetragonal and hexagonal metal identification platelets of various sizes The squares had as through perforations the capital letters G, H, I, J, K and L, a side length of 500 µm, and a distance of the letters from the side of 32 µm. The area of the through perforations accounts for 12.2% of the total surface area.

In the hexagonal platelets with M3 as through perforation, the perforation accounts for 18% of the total surface area and the distance from the through perforation to the side is 16 µm. The diameter from side to side was 200 µm.

A compound was produced with the metal identification platelets "OV Dot Mix".

30 g of metal identification platelets "OV Dot Mix" were mixed in an intensive mixer with 418 g of Makrolon 3108 550115 powder (mean particle diameter 800 µm). At a throughput of the extruder of 3 kg/hour, 2 kg of Makrolon 3108 550115 cylindrical granules were extruded in compartment 1 of a Brabender ZSK twin-screw extruder. A transparent, particle-containing melt was obtained, which after cooling in a water/air bath and strand pelletisation yielded a cylindrical granular material containing 1.23 wt. % of metal identification platelets.

Figure 6:
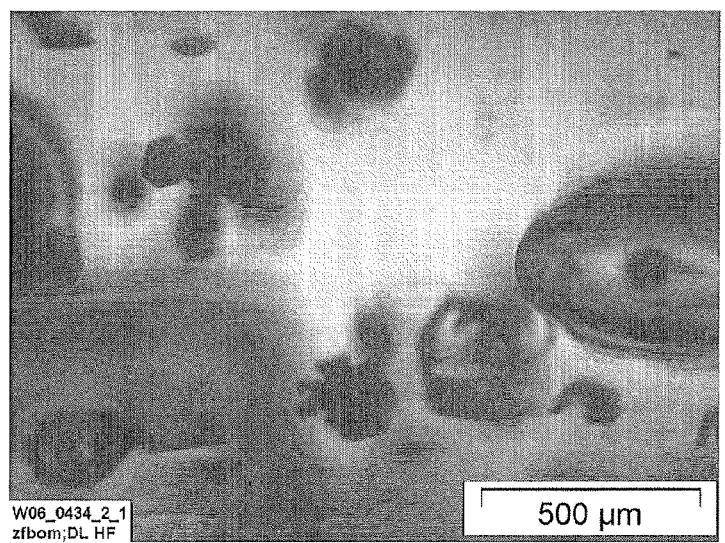
FIG. 6 illustrates a light microscopy image of a grain of granular material and showed that the approx. 500 µm large metal identification platelets are present as bent hexagons and do not satisfy the requirements of the invention.

In a light microscopy image of a grain of granular material (FIG. 6), it could be seen that the approx. 500 µm large metal identification platelets are present as bent hexagons and do not satisfy the requirements of the invention. Although these squares satisfy two requirements as regards the area proportion of the through perforation and the interspacing, nevertheless the platelet is too large and becomes mechanically bent or even destroyed in the extruder.

The originally hexagonal platelets with M3 as through perforation likewise do not satisfy the requirements of the present invention. Even though the surface area proportion of the through perforation at 18% lies within the range according to the invention, the distance of 16 µm from the through perforation to the side is too small, and the diameter of 200 µm from side to side is too large. In the compounding the "M3" platelets were accordingly for the most part destroyed by the shear forces and/or temperature stress. Many fractured pieces could be seen in the granular material.

The diameter of the metal identification platelet and the relevant distance of the through perforation are not in accordance with the invention. The surface area of the through perforation as a proportion of the total surface area of the metal identification platelet is in accordance with the invention.

Example 7

Not According to the Invention

A film was extruded according to the chill-roll method from the compound of Example 6.

The equipment used for the production of the films consists of
- a main extruder with a screw of 30 mm diameter (D) and a length of 27×D;
- a slot die of 300 mm width;
- a smoothing roller;
- a take-off device;
- winding station.

The compound of Example 6 was fed to the feed hopper of the extruder. The melting and conveyance of the respective material took place in the respective plasticization system cylinder/screw of the extruder. The material melt was forced through the slot die and deposited on the smoothing roller. The final shaping and cooling of the film took place on the smoothing roller.

Figure 7:
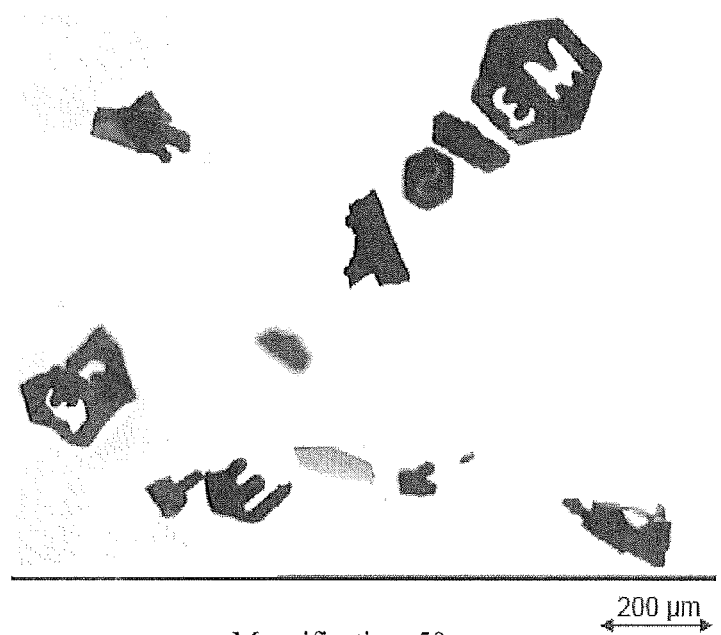
FIG. 7 illustrates a light microscopy image of the film and showed that the approx. 500 µm large metal identification platelets were present in the form of bent hexagons and did not correspond to the requirements of the invention.

In the light microscopy image of the film (FIG. 7) it could be seen that the approx. 500 µm large metal identification platelets were present in the form of bent hexagons and did not correspond to the requirements of the invention. Although these squares satisfy two requirements as regards the proportion of the area represented by the through perforation and the distance, nevertheless the platelet is too large and is mechanically bent or even destroyed in the extruder.

The originally hexagonal platelets with M3 as through perforation similarly do not satisfy the requirements of the present invention. Even if the area proportion of the through perforation of 18% lies within the range according to the invention, the distance of 16 µm from the though perforation to the side is too small, and the diameter of 200 µm an from side to side is too large. In the film extrusion further "M3" platelets were accordingly destroyed by the shear forces and/or temperature stress. Many fractured pieces can also be seen.

Only the approx. 100 µm large metal identification platelets were undamaged.

Example 8

According to the Invention

Starting Material

Hexagonal metal identification platelets with the designation "OV Dot S" made of nickel, and with a thickness of 5 µm and a distance between the opposite sides of 100 µm, were used. The platelets were printed, the lettering "OV Dot" being legible in the relevant sections. A large "S" was formed as through perforation in the centre of the platelets. The distance from the through perforation to the side is 24 µm and the perforation accounts for 26.2% of the total surface area of the metal identification platelet.

A compound was prepared using the metal identification platelets.

150 g of metal identification platelets "OV Dot S" were mixed in an intensive mixer with 1.35 kg of Makrolon 3108 550115 powder (mean particle diameter 800 µm). At a throughput of the extruder of 50 kg/hour 48.5 kg of Makrolon 3108 550115 cylindrical granules were extruded into compartment 1 of the ZSK 53 twin-screw extruder. The metal identification platelet/Makrolon powder mixture was metered in through a side extruder. A transparent, particle-containing melt was obtained downstream of the 3-hole die plate, which after cooling in a water bath and strand pelletisation yielded 50 kg of cylindrical granules containing 0.3 wt. % of metal identification platelets "OV Dot S".

TABLE 3

| Process parameters | |
| --- | --- |
| Temperature in the compartment of the extruder Z1 to Z8 | 220 to 250° C. |
| Melt pressure | 20.7 bar |
| Temperature of the melt | 270° C. |
| Rotational speed of the extruder | 100 min$^{-1}$ |
| Draw-off rate | 30 m/min |
| Throughput | 30 kg/hour |

Figure 8:
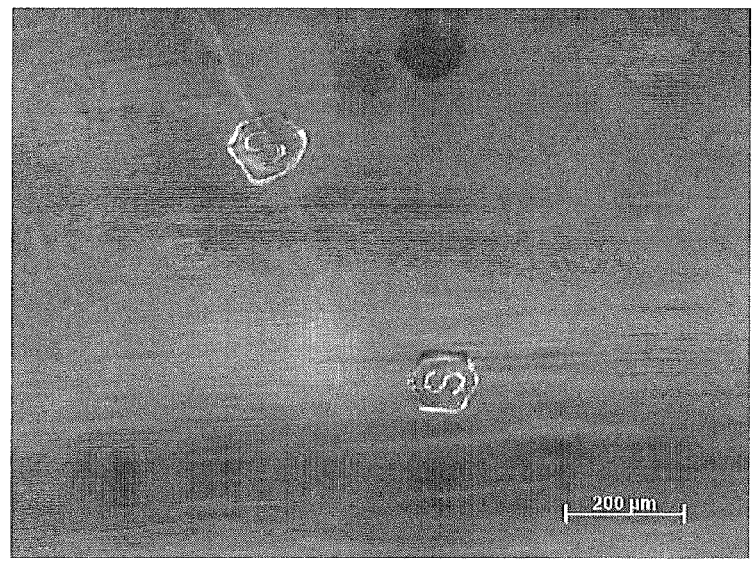
FIG. 8 illustrates a light microscopy image of a grain of granular material and the metal identification platelets could be recognized as hexagons.

In a light microscopy image of a grain of granular material (FIG. 8) the metal identification platelets could be recognised as hexagons. No damaged or even destroyed platelets could be seen. Despite the shear force and the temperature stress in the sheet extrusion the through perforation "S" remained undamaged.

The diameter of the metal identification platelet, distance from the through perforation to the side, and proportion of the through perforation in terms of the total surface area of the metal identification platelet are according to the invention.

Example 9

According to the Invention

The polycarbonate described in Example 8 was used for the extrusion of a polycarbonate film of 350 mm width.

The equipment used consists of
- a Stork extruder with a screw of 37 mm diameter (D) and a length of 24×D.
  - The screw includes a degassing zone;
- melt pump
- a slot die of 350 mm width;
- die orifice: 0.8 mm
- a draw-off device;
- winding station The melt passes from the die to the casting roller and then to the cooling roller, the rollers being at the temperatures specified in Table 4. The film is then passed through a take-off device and finally wound.

TABLE 4

Process parameters:

| Process parameters | |
|---|---|
| Temperature of cylinders 1 to 16 | 230 to 280° C. |
| Melt temperature | 292° C. |
| Rotational speed of melt pump | 28 min$^{-1}$ |
| Temperature of die 1 | 240° C. |
| Temperature of die 2 | 240° C. |
| Temperature of die 3 | 240° C. |
| Rotational speed of extruder | 40 min$^{-1}$ |
| Temperature of roller 1 | 40° C. |
| Temperature of roller 2 | 120° C. |
| Temperature of roller 3 | 140° C. |
| Melt pressure | 81 bar |
| Film thickness | 100 µm |

The following metal identification platelet-containing composition was fed to the extruder:

100.0 wt. % of the compound from Example 8 (containing 0.3 wt. % of metal identification platelets OV Dot "S").

A transparent extrusion film was obtained therefrom, with a smooth/matt (1-4) surface, a metal identification platelet content of 0.3 wt. % and with a thickness of 100 µm.

Figure 9:
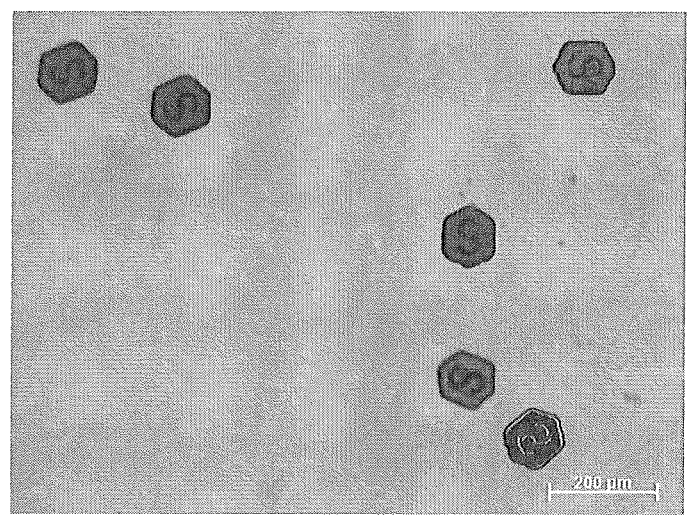
FIG. 9 illustrates a light microscopy image of the film and the metal identification platelets could be seen as small, luminously dark hexagons.

In a light microscopy image of the film (FIG. 9) the metal identification platelets could be seen as small, luminously dark hexagons. No damaged or even destroyed platelets could be seen. Despite the shear force and the temperature stress in the film extrusion, the through perforation "S" remained undamaged.

The diameter of the metal identification platelet, distance from the through perforation to the side, and proportion of the through perforation in terms of the total surface area of the metal identification platelet are in accordance with the invention.

The invention claimed is:

1. A transparent thermoplastic material, containing 0.0001 to 2 wt. % of substantially flat metal identification platelets with a greatest longitudinal dimension of less than 200 µm and a thickness of 2-10 µm, wherein the metal identification platelets do not have any recesses or have recesses that lie substantially in the centre of the metal identification platelet, do not come closer than 20 µm to the circumferential outer edge of the metal identification platelet, and do not account for more than 30% of the surface area of the metal identification platelets, wherein the metal identification platelets are tetragonal, pentagonal, hexagonal, heptagonal or round, wherein the transparent thermoplastic material is polycarbonate and the metal identification platelets are made of nickel.

2. The transparent thermoplastic material according to claim 1, wherein the recesses have the shape of letters or numerals.

3. The transparent thermoplastic material according to claim 1, wherein the recesses have the shape of S, X, dot or circle.

4. The transparent thermoplastic material according to claim 1, containing 0.01 to 0.1 wt. % of metal identification platelets.

5. The transparent thermoplastic material according to claim 1, containing 0.06 wt. % of metal identification platelets.

6. A film containing the transparent thermoplastic material according to claim 1.

7. A multi-layer product containing the transparent thermoplastic material according to claim 1.

8. The multi-layer product according to claim 7, wherein the product is a card.

9. A process for the production of a film which comprises
  a) compounding the transparent thermoplastic material according to claim 1 to form a compound; and
  b) extruding the compound from step a) into a film.

10. A process for the production of a card which comprises
  a) compounding the transparent thermoplastic material according to claim 1 to form a compound;
  b) extruding the compound from step a) into a film; and
  c) processing the film from step b) into a card.

11. The process according to claim 10, wherein in step c) the film is laminated on a substrate.

* * * * *